(12) United States Patent
Fry et al.

(10) Patent No.: US 6,496,938 B1
(45) Date of Patent: Dec. 17, 2002

(54) ENHANCED PCI CLOCK CONTROL ARCHITECTURE

(75) Inventors: Walter G. Fry, Spring, TX (US); Kenneth W. Stufflebeam, Spring, TX (US); Paul C. Stanley, The Woodlands, TX (US)

(73) Assignee: Compaq Information Technologies Group LP, Houston, TX (US)

( * ) Notice: Subject to any disclaimer, the term of this patent is extended or adjusted under 35 U.S.C. 154(b) by 0 days.

(21) Appl. No.: 09/502,326

(22) Filed: Feb. 11, 2000

(51) Int. Cl.[7] ................................................. G06F 1/32
(52) U.S. Cl. ....................................................... 713/322
(58) Field of Search ................................. 713/300, 322, 713/324, 600, 601

(56) References Cited

U.S. PATENT DOCUMENTS 5,586,332 A * 12/1996 Jain et al. ................... 395/750
5,630,145 A * 5/1997 Chen .......................... 395/750
6,021,506 A * 2/2000 Cho et al. ................... 713/601
6,240,522 B1 * 5/2001 Stufflebeam ................ 713/324

* cited by examiner

Primary Examiner—Thomas M. Heckler
(74) Attorney, Agent, or Firm—Akin Gump Strauss Hauer & Feld LLP (57) ABSTRACT

A clock control technique allows reducing the power consumption of devices connected to a computer bus. Individual idle devices can be disconnected from the bus clock by a device clock controller and placed in a low-power state without waiting for all devices on the bus to go idle. When individual devices are idle, transactions on the bus are monitored and unclaimed transactions are claimed by the device clock controller, which then forces a retry of the transaction and reconnects the clock to the idle devices. This brings these devices from the low-power state to a full power state, where they are capable of claiming the transaction when it is retried.

40 Claims, 3 Drawing Sheets

ENHANCED PCI CLOCK CONTROL ARCHITECTURE

BACKGROUND OF THE INVENTION

1. Field of the Invention

The present invention is related to power management of computer bus connected devices and, more particularly, to power management of computer bus connected devices by control of a bus clock signal.

2. Description of the Related Art

A bus provides a mechanism for communications between components of a system or microcontroller. A bus is essentially a collection of wires through which data can be transmitted from one point of a system to another part of the system. In a computer system, for example, a bus connects internal components of the computer to the central processing unit (CPU) and to main memory.

A Peripheral Component Interconnect (PCI) local bus is a high performance synchronous bus architecture that interconnects chips, expansion boards, and processor/memory subsystems. A PCI bus implements a multiplexed address and data bus, with all data transfers being performed relative to a PCI bus clock (CLK).

The PCI bus supports initiators (also known as bus masters), which are intelligent devices that can gain control of the PCI bus. PCI bus masters and the CPU can perform tasks independently of each other. In a typical configuration, the CPU is connected to the PCI bus via a host/PCI bridge, frequently referred to as the north bridge or the host bridge. Expansion busses for devices such as Industry Standard Architecture (ISA) or Extended ISA (EISA) devices are typically connected to the PCI bus via a PCI/ISA bridge, frequently referred to as a south bridge. The south bridge is typically implemented as a chip set that incorporates other functions such as an interrupt controller, an IDE controller, and a DMA controller.

By convention, PCI signals that assume a logic low state when asserted are designated by a pound sign (#) at the end of the signal name. For example, the RST# signal is asserted low to reset the PCI bus. Signal names not ending with a pound sign are asserted high.

Each PCI initiator has a pair of arbitration lines that connect it directly to a PCI bus arbiter. Initiators request ownership of the PCI bus by asserting a REQ# (Request) signal to the PCI arbiter, typically located in a host/PCI or PCI/expansion bus chip set. The PCI arbiter grants bus ownership according to a bus fairness protocol by asserting a GNT# (grant) signal to the requesting initiator. When the initiator samples the GNT# signal asserted, the initiator must wait for the completion of any activity by the initiator currently in control of the bus.

Once the initiator owns the PCI bus, transfers occur between the initiator and a target device (or bus slave). Transfers on the PCI bus are burst operations. The PCI bus transfer includes one address phase and one or more data phases. Each cycle begins with the address phase followed by the data phases. The data phases may repeat indefinitely, but each PCI device has its own timer that defines the maximum amount of time that it may own the PCI bus. The timer is set by the CPU as part of the configuration space.

The PCI bus uses various signals, such as system signals and interface control signals. One system signal is for CLK, which provides the timing reference for all transfers on the PCI bus. All PCI signals except reset (RST#) and interrupts are sampled on the rising edge of the CLK signal, and all bus-timing specifications are defined relative to the rising edge. The minimum frequency of the CLK signal is specified at 0 Hz, which allows CLK to be "suspended" to save power.

One interface control signal is the STOP# signal, which is asserted by a target to request the initiator to terminate the current transaction. If a target requires a long period of time to respond to a transaction, it may use the STOP# signal to suspend the transaction so the PCI bus can perform other interim transfers. The target issues a "Retry" if STOP# is asserted during the first data phase. No data is transferred during the transactions, and the initiator is required to Retry the transaction later. On the other hand, the target issues a "Disconnect" if STOP# is asserted after one or more data phases have successfully completed. For Disconnect, the initiator may choose to continue the transaction at a later time or may choose not to resume the transaction.

Another interface control signal is the DEVSEL# signal, which is asserted by a PCI target when the target detects its own address on the PCI bus. DEVSEL# may be asserted from one to three clocks after the address phase, but must be asserted prior to or with the clock edge in which a target ready (TRDY#) signal is asserted. Once DEVSEL# is asserted, it is deasserted until the last data phase has completed, or the target issues a target abort (i.e., the target asserts STOPS and deasserts DEVSEL# and TRDY#, if not already deasserted). If the initiator does not detect DEVSEL# asserted within six CLK periods, the initiator must assume that the target cannot respond or that the address is unpopulated and terminate the transaction in a master abort.

If a fatal error occurs or the target will never be able to respond to the transaction for some other reason, the target asserts STOP# and deasserts DEVSEL# and TRDY# to signal a target abort to the initiator, indicating an abnormal termination of the bus transfer. A target abort instructs the initiator not to retry the transaction. The initiator can use the target abort to signal system software that a fatal error has occurred.

The initiator uses the FRAME# signal to indicate that the initiator is ready to complete its final data phrase. In addition to the normal termination of a transaction, this may occur when the initiator is preempted by the arbiter deasserting the GNT# signal, or when no target has responded to the address by asserting DEVSEL#. In the latter case, the initiator aborts the transaction and indicates a master abort in the initiator's configuration register.

The CLKRUN# (clock running) signal is an optional sustained tri-state input/output signal used to facilitate stopping the CLK signal to save power. CLKRUN# is intended for "mobile" environments in which reducing power consumption (for example, to extend battery life) is critical; however, CLKRUN# can be used in non-mobile environments to create a system design that draws as little current as possible.

Because most ISA devices do not announce their presence on the bus, configuration software typically cannot detect them and assign address ranges to their address detectors. Therefore, typical ISA bridges use "subtractive decoding" techniques. Subtractive decoding means that the ISA bridge will claim (and pass on to the ISA bus) all transactions that fall into the overall ISA memory or I/O space unclaimed by a PCI device. PCI devices must assert DEVSEL# during one of the first three clock cycles immediately following the completion of the address phase. If DEVSEL# is not detected by the subtractive decoder during those three clock cycles, the subtractive decoder asserts DEVSEL# during the fourth clock cycle, and initiates the transaction on the ISA bus. Only one subtractive decoder is allowed on a PCI bus, and is typically the ISA bridge. However, other subtractive decoders are possible.

Clock generation logic (typically part of the PCI chip set) keeps CLKRUN# asserted when the clock is running normally. During periods when the clock has been stopped (or slowed), the clock generation logic monitors CLKRUN#. Asserting CLKRUN# by initiator and target devices requests the PCI clock-signal to be restored to full speed. The clock cannot be stopped if the bus is not idle. Before stopping or slowing the clock frequency, the clock generation logic deasserts CLKRUN# for one clock cycle to inform PCI devices that the clock is about to be stopped (or slowed). After deasserting CLKRUN# for one clock cycle, the clock generation logic tri-states its CLKRUN# output driver. A keeper resistor on CLKRUN# assumes responsibility for maintaining the deasserted state of CLKRUN# during any period in which the clock is stopped (or slowed).

The clock continues to run unchanged for a minimum of four clock cycles after the clock generation logic deasserts CLKRUN#, indicating its intention to stop (or slow) the clock. During this period of time, a target (or master) that requires continued clock operation, for example, to perform internal housekeeping after the completion of a transaction, may reassert CLKRUN# for two PCI clock cycles to request continued generation of CLK. When the clock generation logic samples CLKRUN# reasserted, it reasserts CLKRUN# and continues to generate the clock, rather than stopping it or slowing it down.

After the clock has been stopped (or slowed), a master or multiple masters may require clock restart in order to request use of the PCI bus. Prior to issuing the bus request, therefore, the master(s) must first request clock restart. This is accomplished by asserting CLKRUN#. When the clock generation logic detects CLKRUN# asserted by another party, it turns on (or speeds up) the clock and turns on its CLKRUN# output driver to assert CLKRUN#. When the master detects CLKRUN# asserted for two rising edges of the PCI CLK signal, the master may then tri-state its CLKRUN# output driver.

The architecture described above provides the capability for shutting off the PCI clock signal to all of the PCI devices after a determination that those PCI devices that support having their clocks turned off are in an idle state. The clock signals are turned off only when all of the PCI devices are idle. If one device is transferring data to another device, then all devices will have their clocks running. When the clock is off, the PCI devices typically go into a low-power state. Thus, some potential power savings are not gained because all devices must be idle before turning off any PCI clocks.

SUMMARY OF THE INVENTION

A clock control mechanism provides enhanced power management for devices connected to a computer bus. A clock generator generates a clock signal to the bus-connected devices. A clock controller controls the clock generator, signaling it to start and stop the clock. A device clock controller coupled to the clock controller and at least one other bus-connected device signals the clock controller that the bus is idle when all of the other bus-connected devices are idle. If some of the other bus-connected devices are idle, then the device clock controller individually disconnects the clock signal from any of the other bus-connected devices that are idle.

In one embodiment, a clock running signal is deasserted by the clock controller to indicate that the clock signal is about to be stopped. The device clock controller reasserts the clock running signal if any of the other bus-connected devices are active, and individually asserts the clock running signal to each of the other bus-connected devices. Each active device of the other bus-connected devices asserts its individual copy of the clock running signal.

In another embodiment, the clock controller uses a gate to disconnect the clock signal from each of the other bus-connected devices.

In one embodiment, when some of the other bus-connected devices are idle, the device clock controller monitors transactions on the computer bus. Unclaimed transactions are claimed by the device clock controller and a retry of the transaction is forced. The device clock controller then reconnects the clock signal to the other bus-connected devices and signals the clock controller that some of the other bus-connected devices are active. In one embodiment, the device clock controller is a subtractive decoder that reconnects the clock signal to all of the other bus-connected devices. In another embodiment, the device clock controller is a positive decoder and reconnects the clock signal to the other bus-connected device addressed by the transaction.

BRIEF DESCRIPTION OF THE DRAWINGS

A better understanding of the present invention can be obtained when the following detailed description is considered in conjunction with the following drawings.

While the invention is susceptible to various modifications and alternative forms, specific embodiments thereof have been shown by way of example in the drawings and are herein described in detail. It should be understood, however, that the description of specific embodiments herein is not intended to limit the invention to the particular forms disclosed. On the contrary, the intention is to cover all modifications, equivalents, and alternatives falling within the spirit and scope of the invention as defined by the appended claims.

DETAILED DESCRIPTION OF PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Typical Clock Control Architecture

Figure 1:
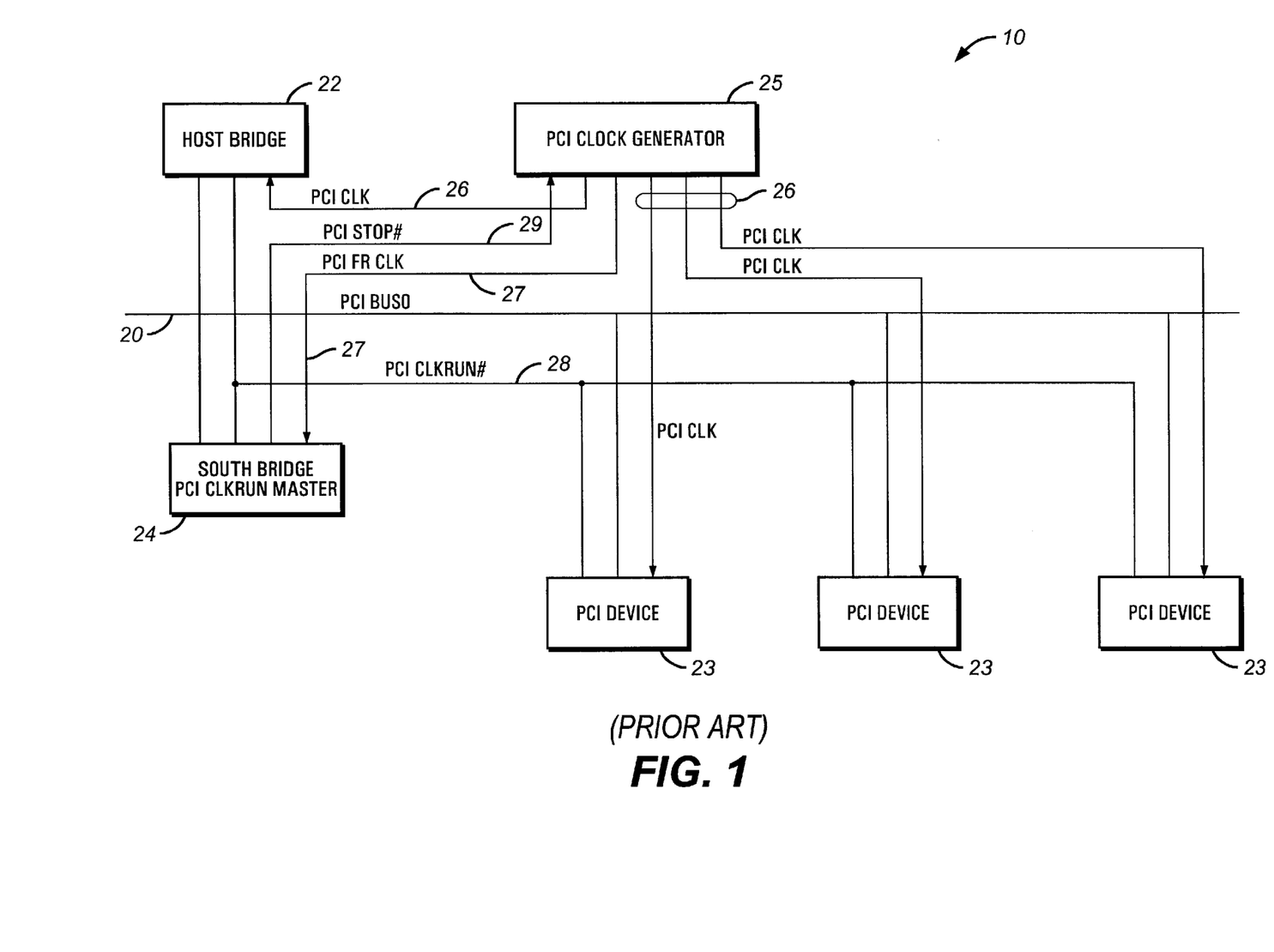
FIG. 1 is a block diagram of a prior art clock control architecture.

Referring to FIG. 1, a typical clock control architecture 10 is shown. A PCI bus 20 is controlled by PCI controller circuitry located within a memory/accelerated graphics port (AGP)/PCI controller ("Host" Bridge) 22. The Host Bridge 22 couples the PCI bus 20 to a processor via a host bus (not shown). The Host Bridge 22 is a low latency path that allows the processor to directly access PCI devices 23 mapped in the memory, I/O, or configuration address spaces. A second bridge circuit ("South" Bridge) 24, for example, a PCI/SA bridge, bridges the PCI bus 20 and an expansion bus, such as an ISA, EISA, or Micro Channel bus (not shown). A PCI clock generator 25 provides a PCI CLK signal 26 to the Host Bridge 22 and the PCI devices 23. The South Bridge 24 typically includes a top level PCI CLKRUN master. A free running clock signal PCI FR CLK 27 is needed by and provided to the top level PCI CLKRUN master in the South Bridge 24. The free running clock signal PCI FR CLK 27 is always active, even when the PCI CLK signal 26 is stopped. The PCI CLK signal 26 is controlled from the South Bridge 24 via the use of a PCI STOP# signal 29. Note that the PCI STOP# signal 29 is a different signal from the standard PCI interface control signal STOP#. The capability of putting the PCI devices 23 into a low-power state by removing their clocks thus is not fully used. Because all of the PCI devices 23 must first become idle before turning off the PCI CLK signal 26, some potential power savings are not gained and power management is not optimized.

Computer System Overview

Figure 2:
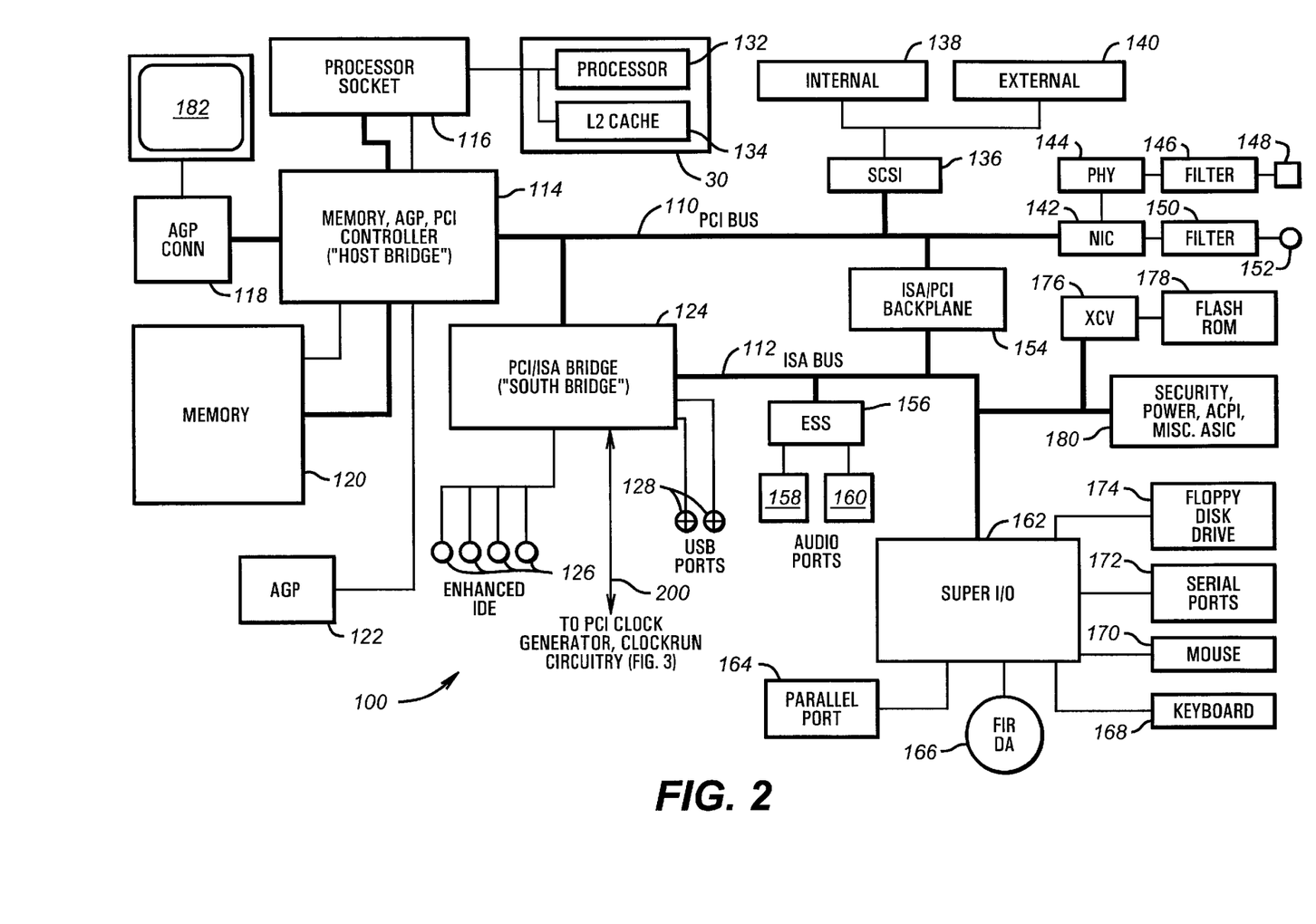
FIG. 2 is a block diagram of a computer system in accordance with an embodiment of the invention.

Turning to FIG. 2, a typical computer system 100 is illustrated according to one embodiment of the invention. While this system is illustrative of one embodiment, the techniques according to the invention can be implemented in a wide variety of systems. The computer system 100 in the illustrated embodiment is a PCI bus/ISA bus-based machine, having a PCI peripheral bus 110 and an ISA bus 112. Other buses, such as EISA, Micro Channel, and the like, or even other expansion PCI buses, could have been diagrammed, and are included within the scope of the present invention. The PCI bus 110 is controlled by PCI controller circuitry located within a memory/accelerated graphics port (AGP)/PCI controller 114. The controller 114 (the "Host Bridge") couples the PCI bus 110 to a processor socket 116 via a host bus, an AGP connector 118, a memory subsystem (main memory) 120, and an AGP 122. A second bridge circuit, a PCI/ISA South Bridge 124, bridges between the PCI bus 110 and the ISA bus 112.

In a disclosed embodiment, the Host Bridge 114 can be a 440LX North Bridge Integrated Circuit by Intel Corporation, also known as the PCI AGP Controller (PAC). The South Bridge 124 can be a PIIX4, also by Intel Corporation. The Host Bridge 114 and the South Bridge 124 could be replaced with other bridge chip sets without departing from the spirit and scope of the invention. The Host Bridge 114 and the South Bridge 124 provide capabilities other than bridging between the processor socket 116 and the PCI bus 110, and between the PCI bus 110 and the ISA bus 112. Specifically, the disclosed Host Bridge 114 includes interface circuitry for the AGP connector 118, the memory subsystem 120, and the AGP 122. The disclosed ISA bridge 124 further includes an internal enhanced IDE controller for controlling up to four enhanced IDE drives 126, and a universal serial bus (USB) controller for controlling USB ports 128.

The processor socket 116 is designed to receive a processor module 30, for example, a PENTIUM II™ processor from the Intel Corporation, which, in turn, includes a microprocessor core 132 and a level two (L2) cache 134. Processors other than the PENTIUM II™ could be used without departing from the spirit and scope of the invention.

The PCI/ISA bridge 124 includes enhanced power management, as indicated schematically by lines 200 that couple the South Bridge 124 to a PCI clock generator and additional clock control circuitry discussed below in reference to FIG. 3. The lines 200 are meant to include multiple lines coupling these devices and circuitry. The enhanced power management within the PCI/ISA bridge 124 includes full clock control, device management, suspend and resume logic, Advanced Configuration and Power Interface (ACPI), and System Management Bus (SMBus) control, which is based on the Inter-Integrated Circuit ($I^2C$) protocol. It supports a PCI bus at 30 or 33 MHz and an ISA bus 112 at one-quarter of the PCI bus frequency. PCI revision 2.2 is supported with both positive and subtractive decode. The standard personal computer input/output functions are supported, including a direct memory access (DMA) controller, two 82C59 interrupt controllers and 8254 timer, a real time clock (RTC) with a 256 byte complementary metal oxide semiconductor (CMOS) static RAM (SRAM), and chip selects for system read only memory (ROM), Real Time Clock (RTC), keyboard controller, an external microcontroller, and two general purpose devices.

The PCI bus 110 couples a variety of devices that generally take advantage of a high-speed data path. This includes a small computer system interface (SCSI) controller 136, with both an internal port 138 and an external port 140. In a disclosed embodiment, the SCSI controller 136 is an AIC-7860 SCSI controller. Also coupled to the PCI bus 110 is a network interface controller (NIC) 142. The NIC 142 is coupled through a physical layer 144 and a filter 146 to an RJ-45 jack 148, and through a filter 150 to an AUI jack 152.

Between the PCI bus 110 and the ISA bus 112, an ISA/PCI backplane 154 is provided, which includes a number of PCI and ISA slots. This allows ISA cards or PCI cards to be installed into the system for added functionality.

Further coupled to the ISA bus 112 is an enhanced sound system chip (ESS) 156, which provides sound management through an audio in port 158 and an audio out port 160. The ISA bus 112 also couples the PCI/ISA Bridge 124 to a Super I/O chip 162, which in one embodiment is a National Semiconductor Corporation PC87307VUL device. The Super I/O chip 162 contains several logical devices, one of which is an RTC. Resident in the RTC of the Super I/O chip 162 is non-volatile Random Access Memory (NVRAM) 163. This Super I/O chip 162 provides a variety of input/output functions, including a parallel port 164, an infrared port 166, a keyboard controller for a keyboard 168, a mouse port for a mouse 170, additional serial ports 172, and a floppy disk drive controller for a floppy disk drive 174. Hard disk drive, CD-ROM, and DVD controllers, and the like, could also be provided by the Super I/O chip 162 for corresponding devices coupled through connectors to the Super I/O chip 162.

The ISA bus 112 can also be coupled through bus transceivers 176 to a flash ROM 178. The flash ROM 178 can include both basic input/output system (BIOS) code for execution by the processor 132, as well as additional code for execution by microcontrollers in a ROM-sharing arrangement.

The ISA bus 112 can further couple the ISA bridge 124 to a security, power, ACPI, and miscellaneous Application Specific Integrated Circuit (ASIC) 180, which provides a variety of miscellaneous functions for the system. For example, the ASIC 180 can include security features, system power control, light emitting diode (LED) control, remote wake-up logic, system fan control, hood lock control, ACPI registers and support, system temperature control, and various glue logic.

A video display 182 also can be coupled to the AGP connector 118 for display of data by the computer system 100.

It will be appreciated by those skilled in the art that a variety of configurations of the computer system 100 are possible, which are included within the spirit and scope of the present invention.

Enhanced Clockcontrol Architecture

Figure 3:
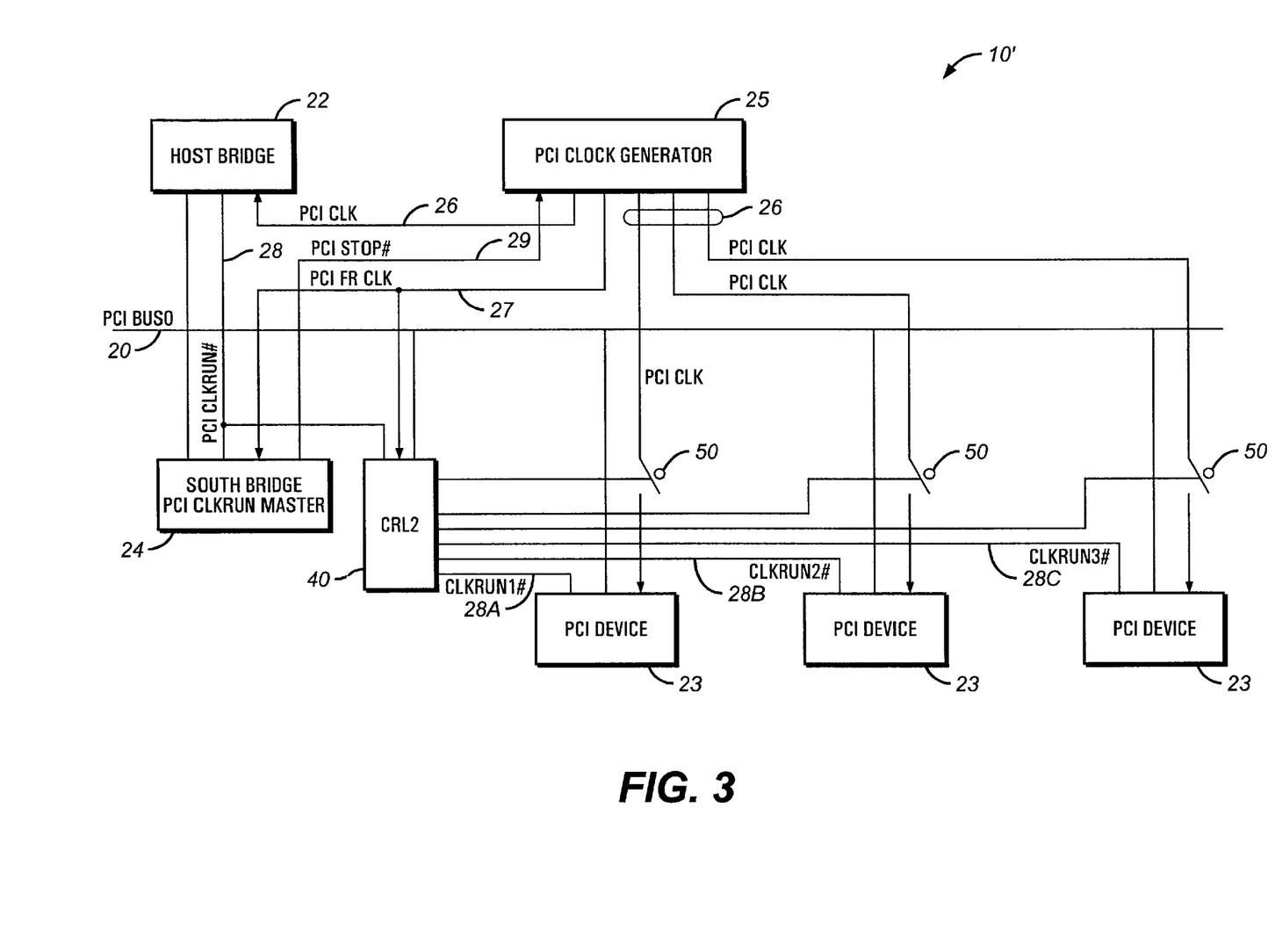
FIG. 3 is a block diagram of an enhanced clock control architecture in accordance with an embodiment of the invention.

In a disclosed embodiment shown in FIG. 3, a clock control architecture 10' can be included in a computer system, such as the computer system 100. Again, a wide variety of systems and subsystems could be used instead of the disclosed system 100 without departing from the spirit and scope of the invention. The clock control architecture 10' uses the CLKRUN# signal 28 to control each PCI device 23 individually rather than on the global basis used in current systems, such as the clock control architecture 10 shown in FIG. 1. Although the PCI devices 23 are not differentiated in FIG. 3, it will be appreciated by those skilled in the art that the PCI devices 23 could be any of a variety of PCI bus-compatible devices, such as a PCMCIA card bus controller (e.g., a TI 1450 by Texas Instruments), an audio device (e.g., an ESS Allegro by ESS Technology, Inc.), a graphics device (e.g., a 3D Rage Mobility by ATI, Inc.), a Mini-PCI device (e.g., a modem or NIC on the bus), a hard drive, and the like without departing from the spirit and scope of the invention.

Hardware circuitry CLKRUN Level2 ("CRL2") 40, for example, which can be implemented as a low-cost ASIC, is a modification to the current CLKRUN# signal 28 architecture shown in FIG. 1. The CRL2 40 aggressively controls the CLKRUN# signal 28 and the PCI CLK 26 from the PCI clock generator 25 to each PCI device 23, but not to the South Bridge 24 corresponding to the South Bridge 124 of FIG. 2 and the Host Bridge 22 corresponding to the Host Bridge 114 of FIG. 2. The South Bridge 24 is not controlled because it contains the top level PCI CLKRUN master to which the free running clock signal PCI FR CLK 27 is provided. The Host Bridge 22 is also not controlled by the CRL2 40, because typically all transactions that occur on the PCI bus 20 involve the Host Bridge 22. A system with sufficient peer-to-peer traffic could be implemented with the Host Bridge 22 controlled in the same way as the PCI devices 23 without departing from the spirit and scope of the invention.

The CRL2 40 follows the standard PCI CLKRUN# protocol when controlling individual copies of the CLKRUN# signal 28 passed to the PCI devices 23, indicated in FIG. 3 as CLKRUN1# 28A, CLKRUN2# 28B, and CLKRUN3# 28C. The CRL2 40 will deassert each individual copy of the CLKRUN# signal 28 to the PCI devices 23 responsive to the South Bridge 24 deasserting the CLKRUN# signal 28 on the first clock cycle after the PCI bus 20 goes idle. If any PCI device 23 which does not respond by asserting its individual copy of the CLKRUN# signal 28 (i.e., CLKRUN# 28A, 28B, or 28C) to indicate that it is active, then that PCI device 23 will be considered idle. The CLR2 40 will turn off a corresponding gate (e.g., a quickswitch) 50 for the PCI device 23, which will disconnect that device's PCI CLK signal 26. It is possible to have the gate 50 for one of the PCI devices 23 turned off while the other gates 50 for the remaining PCI devices 23 are still on/active. Disconnecting the PCI CLK signal 26 from any PCI device 23 causes that device 23 to go into a low-power state. Once all of the PCI devices 23 are in the low-power state with each PCI CLK signal 26 removed, the CRL2 40 will respond to the main PCI CLKRUN master (the South Bridge 24) by deasserting the CLKRUN# signal 28 to indicate that the PCI CLK signal 26 from the PCI clock generator 25 can be stopped. Until then, the CRL2 40 will respond by asserting the CLKRUN# signal 28 whenever the PCI CLKRUN master 24 deasserts it.

Restarting the PCI CLK signal 26 also involves the CRL2 40. If all of the PCI devices 23 have been disconnected from the PCI CLK signal 26, the PCI bus 20 is idle and the South bridge 24 will hold the CLKRUN# signal 28 deasserted and the PCI STOP# signal 29 asserted to tell the clock generator 25 to stop the PCI clock and the PCI CLK signal 26. In that state, if the Host Bridge 22 or the South Bridge 24 wants to initiate a PCI transaction, then the South Bridge 24 deasserts the PCI STOP# signal 29 to tell the clock generator 25 to restart the PCI clock and the PCI CLK signal 26. One clock cycle later, the South Bridge 24 will assert the CLKRUN# signal 28 to the CRL2 40, which will assert individual copies of the CLKRUN# signal 28 to each of the PCI devices 23 and reconnect the PCI CLK signal 26 to each of the PCI devices 23 by turning on the gate 50 for each of the PCI devices 23, causing each of the PCI devices 23 to assert their individual copy of the CLKRUN# signal 28.

The technique is more complex if only some of the PCI devices 23 have had their clock stopped. In that case, the CRL2 40 monitors transactions on the PCI bus 20. In a disclosed embodiment, the CRL2 40 is configured to monitor and subtractively decode transactions on the PCI bus 20. Only one agent on the PCI bus 20 may implement a subtractive decoder. The South Bridge 24 is typically a subtractive decoder in conventional systems, as described above, to allow subtractive decoding of addresses on the expansion bus (e.g., ISA, EISA, or Micro Channel). To implement the CRL2 40 as a subtractive decoder, the South Bridge 24 must positively decode addresses placed on the PCI address bus. Therefore, either the South Bridge 24 must be configured to monitor and know all of the address ranges assigned by devices on the expansion bus or all of the devices on the expansion bus must be able to positively decode addresses. This typically means that no ISA cards are attached to the expansion bus or that only Plug-and-Play ISA cards are connected to the expansion bus.

As a subtractive decoder, if no PCI device 23 claims a PCI transaction during one of the first three clock cycles immediately following the completion of the address phase, the CRL2 40 will claim the transaction by asserting the DEVSEL# signal. At the same time, the CRL2 40 will assert the individual copy of the CLKRUN# signal 28 and reconnect the PCI CLK signal 26 to all turned off PCI devices 23 by turning on the corresponding gate 50. When the initiator of the transaction retries the transaction, all of the PCI devices 23 will be ready to decode the address. The CRL2 40 can then repeat the process of turning off individual PCI devices 23, as described above, when the PCI bus 20 goes idle.

In another embodiment, the CRL2 40 positively decodes addresses instead of substractively decoding them. In that embodiment, the CRL2 40 will snoop configuration cycles for each of the PCI devices 23, so that it can recognize which addresses are decoded by which PCI device 23. The CRL2 40 will then monitor the start/stop status of the PCI CLK signal 26 to each of the PCI devices 23. When a transaction for a stopped device is decoded, the CRL2 40 will assert DEVSEL# and STOP#, as described above, to claim the transaction and force a Retry. It can then turn on the stopped PCI device 23, as described above, leaving the remaining stopped PCI devices 23 in the stopped and low-power state.

Disclosed embodiments thus advantageously can aid in reducing power consumption by individually controlling the PCI CLK signal 26 to each of the PCI devices 23. For battery-powered devices, such as mobile devices, this can extend battery life because power consumption is reduced when the individual PCI devices 23 are put into the low-power state. These embodiments can be implemented with minimal economic and physical layout cost impacts. For example, an embodiment that supports the attachment of three PCI devices 23 can be implemented with approximately 18 I/O pins, to fit into a 32 pin thin quad flatpack (TQFP) or smaller package. The CRL2 40 can be implemented with minimal power consumption. Further, the disclosed embodiments are not limited to mobile platforms, but can be useful in other configurations, such as a desktop, where minimizing power consumption is desirable for reasons like environmental reasons. Because the disclosed embodiments are implemented in hardware only, no OS or BIOS modifications or other software support is required.

The particular embodiments disclosed above are illustrative only, and may be modified and practiced in different but equivalent manners apparent to those skilled in the art having the benefit of the teachings herein. Furthermore, no limitations are intended to the details of construction, design, or method of operation shown herein, other than as described in the claims below. It is therefore evident that the particular embodiments disclosed above might be altered or modified, for example, with changes made in the components, circuit elements, circuit configurations, and signal connections, as well as in the details of the illustrated circuitry, without departing from the spirit and scope of the invention. Accordingly, the protection sought herein is as set forth in the claims below.

We claim:

1. A computer bus clock control mechanism for a computer bus, comprising:
   a clock generator adapted to generate a clock signal from a clock to bus-connected devices,
   a clock controller adapted to produce a clock control signal to signal the clock generator to stop the clock signal when the computer bus is idle and to start the clock signal when the computer bus is not idle,
   a device clock controller coupled to the clock controller and at least one other bus-connected device,
   wherein the clock controller is adapted to determine whether the bus is idle responsive to a signal from the device clock controller that the at least one other bus-connected device is idle, and
   wherein the device clock controller is adapted to individually disconnect the clock signal from the at least one other device that is idle.

2. A computer bus clock control mechanism as in claim 1, wherein the clock controller deasserts a clock running signal to the device clock controller to indicate a request to stop the clock signal and asserts the clock running signal to the device clock controller to indicate the clock is running,
   wherein the device clock controller deasserts an individual copy of the clock running signal to each of the at least one other bus-connected devices responsive to the deassertion of the clock running signal by the clock controller,
   wherein each of the at least one other device that is not idle asserts the individual copy of the clock running signal responsive to the deassertion of the individual copy of the clock running signal by the device clock controller,
   wherein the device clock controller asserts the clock running signal responsive to the assertion of any of the individual copies of the clock running signal, and
   wherein the clock controller signals the clock generator to stop and start the clock signal responsive to the assertion and deassertion of the clock running signal from the device clock controller.

3. A computer bus clock control mechanism as in claim 2, wherein the clock controller deasserts the clock running signal to the device clock controller when the computer bus is idle.

4. A computer bus clock control mechanism as in claim 2, wherein the clock running signal comprises the PCI CLKRUN# signal.

5. A computer bus clock control mechanism as in claim 1, wherein the device clock controller comprises:
   at least one gate corresponding to each of the at least one other device, each of the at least one gate coupled to one of the at least one other device,
   wherein the device clock controller disconnects the clock signal to any of the at least one other device by turning off the corresponding at least one gate.

6. A computer bus clock control mechanism as in claim 1, wherein the at least one gate comprises a quickswitch.

7. A computer bus clock control mechanism as in claim 1, wherein the device clock controller monitors the computer bus when some of the at least one other device are idle,
   wherein the device clock controller claims any unclaimed transaction on the computer bus, issues a retry to the unclaimed transaction, reconnects the clock signal to the at least one other device, and signals the clock controller that the at least one other device is active.

8. A computer bus clock control mechanism as in claim 7, wherein the device clock controller uses subtractive decoding to detect an unclaimed transaction.

9. A computer bus clock control mechanism as in claim 8, further comprising:
   a bus bridge coupled to the computer bus and adapted to positively decode address signals for devices coupled to a second bus.

10. A computer bus clock control mechanism as in claim 7, wherein the device clock controller causes a retry of the unclaimed transaction by asserting a PCI STOP# signal.

11. A computer bus clock control mechanism as in claim 7, wherein the device clock controller claims the transaction by asserting a PCI DEVSEL# signal.

12. A computer bus clock control mechanism as in claim 1, wherein disconnecting the clock signal from any of the at least one other devices saves power.

13. A computer bus clock device control mechanism as in claim 1, wherein the device clock controller comprises an application specific integrated circuit.

14. A computer bus clock control mechanism as in claim 1, wherein the clock generator, the clock controller, and the device clock controller interact independently of any software control.

15. A computer bus clock control mechanism as in claim 1,
   wherein the device clock controller monitors the computer bus when a number less than all of the at least one other devices is idle, wherein the device clock controller claims any unclaimed transaction on the computer bus for any of the at least one other device that has been disconnected from the clock signal, issues a retry for the unclaimed transaction, reconnects the clock signal to the appropriate one of the at least one other device, and asserts the clock running signal to the clock controller.

16. A computer system, comprising:

a processor;

a peripheral bus coupled to the processor;

at least one peripheral device coupled to the peripheral bus; and a clock control mechanism coupled to the peripheral bus and each of the at least one peripheral device, the clock control mechanism comprising:

a clock generator adapted to produce a clock signal to each of the at least one peripheral device;

a clock controller adapted to produce a clock control signal to start and stop the clock signal; and a device clock controller coupled to the clock controller and to each of the at least one peripheral devices, wherein the clock controller signals the clock generator to stop the clock when the computer bus is idle and signals the clock generator to start the clock when the computer bus is not idle.

17. A computer system as in claim 16, wherein the clock controller determines whether the bus is idle responsive to a signal from the device clock controller that all of the at least one peripheral devices are idle, and wherein the device clock controller individually disconnects the clock signal from any of the at least one peripheral devices that is idle.

18. A computer system as in claim 16, wherein the clock controller deasserts a clock running signal to the device clock controller to indicate a request to stop the clock and asserts the clock running signal to indicate the clock is running, wherein the device clock controller deasserts an individual copy of the clock running signal to each of the at least one peripheral device responsive to the deassertion of the clock running signal by the clock controller, wherein each of the at least one peripheral device that is not idle asserts the individual copy of the clock running signal responsive to the deassertion of the individual copy of the clock running signal by the device clock controller, wherein the device clock controller asserts the clock running signal responsive to the assertion of any of the individual copies of the clock running signal, and wherein the clock controller signals the clock generator to stop and start the clock signal responsive to the assertion and deassertion of the clock running signal from the device clock controller.

19. A computer system as in claim 16, wherein the device clock controller monitors the peripheral bus when some of the at least one peripheral device are idle, wherein the device clock controller claims any unclaimed transaction on the peripheral bus, issues a retry to the unclaimed transaction, reconnects the clock signal to all of the at least one peripheral device, and signals the clock controller that some of the at least one peripheral device are active.

20. A computer system as in claim 16, further comprising:

a bus bridge coupled to the peripheral bus and adapted to positively decode address signals for devices coupled to a second bus, wherein the device clock controller is adapted to use subtractive decoding to detect an unclaimed transaction.

21. A computer system as in claim 16, wherein disconnecting the clock signal from any of the at least one peripheral device save power.

22. A method for reducing power consumption in devices coupled to a computer bus having a bus clock, the method comprising the steps of:

determining that the computer bus is idle;

indicating that a bus clock signal is about to be stopped;

determining which of the devices are idle;

individually disconnecting the bus clock signal from the idle devices;

requesting the bus clock keep running if all of the devices are not idle; and stopping the bus clock if all of the devices are idle.

23. A method as in claim 22, wherein the idle devices disconnected from the bus clock signal are placed in a low-power state.

24. A method as in claim 22, the step of indicating that a bus clock signal is about to be stopped comprising the step of:

deasserting a clock running signal.

25. A method as in claim 24, the step of determining which of the devices are idle comprising the step of:

individually copying the clock running signal to each of the devices; and detecting which of the devices fails to reassert the individual copy of the clock running signal when deasserted.

26. A method as in claim 22, the step of individually disconnecting the bus clock signal from the idle devices comprising the step of:

turning off gates connecting the idle devices to the bus clock signal.

27. A method as in claim 22, the step of requesting the bus clock keep running comprising the step of:

detecting the deassertion of a clock running signal; and reasserting the clock running signal.

28. A method as in claim 22, the step of stopping the bus clock comprising the step of:

signaling a clock generator to stop the bus clock.

29. A method for restoring power to devices in a low-power state coupled to a computer bus having a bus clock, the method comprising the steps of:

monitoring the computer bus for transactions involving devices in the low-power state;

determining if a transaction is unclaimed;

claiming the transaction if it is unclaimed;

causing the transaction to be retried; and reconnecting the bus clock to those devices in the low-power state, which restores power to the devices.

30. A method as in claim 29, the step of monitoring the computer bus comprising the step of:

monitoring an address phase of transactions on the computer bus.

31. A method as in claim 29, the step of determining if a transaction is unclaimed comprising the step of:

detecting the absence of a signal from any device claiming the transaction.

32. A method as in claim 31, the step of reconnecting the bus clock comprising the steps of:
turning on a gate connecting the bus clock to each device; and
asserting a clock running signal to each device.

33. A method as in claim 29, the step of determining if a transaction is unclaimed comprising the steps of:
keeping a list of devices in the low-power state and their associated addresses; and
detecting an address phase of a transaction associated with a member of the list of devices in the low-power state.

34. A method as in claim 33, the step of reconnecting the bus clock comprising the steps of:
turning on a gate connecting the bus clock to the device associated with the unclaimed transaction; and
asserting a clock running signal to the device associated with the unclaimed transaction.

35. A computer bus clock control mechanism for a computer bus, comprising:
means for generating a bus clock signal for the computer bus;
means for determining that the computer bus is idle;
means for signaling that the bus clock signal is about to be stopped;
means for determining when any of a set of bus-connected peripheral devices are idle;
means for individually disconnecting the bus clock signal from idle bus-connected peripheral devices;
means for keeping the bus clock signal running if any bus-connected peripheral device is not idle; and
means for stopping the bus clock signal of all bus-connected peripheral devices are not idle.

36. A computer bus clock control mechanism as in claim 35,
wherein bus-connected peripheral devices disconnected from the bus clock signal are placed in a lower power state.

37. A computer bus clock control mechanism as in claim 35, further comprising:
means for monitoring transactions on the computer bus;
means for detecting and claiming unclaimed transactions;
means for retrying unclaimed transactions claimed by the claiming means; and
means for reconnecting the bus clock signal to bus-connected peripheral devices disconnected from the bus clock signal.

38. A computer bus clock control mechanism as in claim 37,
wherein reconnecting the bus clock signal to a bus connected peripheral device restores power to the bus connected peripheral device.

39. A computer bus clock control mechanism as in claim 37, wherein the means for detecting and claiming comprises:
means for positively decoding bus-connected peripheral device addresses for transactions on the computer bus,
wherein the means for reconnecting reconnects the bus clock signal to the bus-connected peripheral device associated with a positively decoded address.

40. A computer bus clock control mechanism as in claim 37, wherein the means for detecting and claiming comprises:
means for subtractively decoding bus-connected peripheral device addresses for transactions on the computer bus,
wherein the means for reconnecting reconnects the bus clock signal to all the bus-connected peripheral devices.

* * * * *